US008364793B2

(12) United States Patent
Asai et al.

(10) Patent No.: US 8,364,793 B2
(45) Date of Patent: Jan. 29, 2013

(54) COMMUNICATION TERMINAL, USER DATA TRANSFERRING SYSTEM AND USER DATA TRANSFERRING METHOD

(75) Inventors: Mao Asai, Kawasaki (JP); Masakazu Nishida, Yokosuka (JP); Naoki Naruse, Yokohama (JP); Hisashi Yoshinaga, Yokohama (JP); Fukiko Takayama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 307 days.

(21) Appl. No.: 12/296,118

(22) PCT Filed: Apr. 9, 2007

(86) PCT No.: PCT/JP2007/057814
§ 371 (c)(1),
(2), (4) Date: Dec. 5, 2008

(87) PCT Pub. No.: WO2007/116993
PCT Pub. Date: Oct. 18, 2007

(65) Prior Publication Data
US 2009/0287760 A1    Nov. 19, 2009

(30) Foreign Application Priority Data
Apr. 7, 2006    (JP) ............................... P2006-106537

(51) Int. Cl.
*G06Q 40/00*    (2006.01)
*G06F 15/16*    (2006.01)
*G06F 9/44*    (2006.01)

(52) U.S. Cl. ........ 709/221; 709/203; 709/206; 709/245; 705/35; 705/39; 705/40; 705/41; 705/44; 717/120

(58) Field of Classification Search ........................ None
See application file for complete search history.

(56) References Cited

U.S. PATENT DOCUMENTS

| 7,685,067 | B1 * | 3/2010 | Britto et al. | 705/40 |
| 7,685,605 | B1 * | 3/2010 | Ahmed et al. | 719/318 |
| 2002/0099652 | A1 * | 7/2002 | Herzen et al. | 705/39 |
| 2002/0124014 | A1 * | 9/2002 | Noguchi | 707/204 |
| 2003/0149880 | A1 * | 8/2003 | Shamsaasef et al. | 713/182 |

(Continued)

FOREIGN PATENT DOCUMENTS
CN    1503179 A    6/2004
EP    1 420 324 A1    5/2004

(Continued)

OTHER PUBLICATIONS

Notice of Allowance issued Oct. 19, 2010, in Japanese Patent Application No. 2006-106537.

(Continued)

*Primary Examiner* — Ario Etienne
*Assistant Examiner* — Ho Shiu
(74) *Attorney, Agent, or Firm* — Oblon, Spivak, McClelland, Maier & Neustadt, L.L.P.

(57) ABSTRACT

A first communication terminal is a communication terminal which executes an application using user data which can be output to a second communication terminal, and has a management data making section which makes management data including an access information of a server capable of transmitting the application, and a data transmitting section which transmits the user data and the management data to the second communication terminal.

15 Claims, 4 Drawing Sheets

U.S. PATENT DOCUMENTS

| | | | |
|---|---|---|---|
| 2004/0015415 A1* | 1/2004 | Cofino et al. | 705/26 |
| 2004/0103063 A1* | 5/2004 | Takayama et al. | 705/41 |
| 2004/0103156 A1* | 5/2004 | Quillen et al. | 709/206 |
| 2004/0254867 A1* | 12/2004 | Nethery, III | 705/35 |
| 2005/0015401 A1* | 1/2005 | Chang et al. | 707/103 R |
| 2005/0091308 A1* | 4/2005 | Bookman et al. | 709/203 |
| 2005/0097040 A1* | 5/2005 | Chen et al. | 705/40 |
| 2005/0120211 A1 | 6/2005 | Yokoyama | |
| 2005/0163093 A1* | 7/2005 | Garg et al. | 370/342 |
| 2005/0216331 A1* | 9/2005 | Ahrens et al. | 705/11 |
| 2005/0262103 A1* | 11/2005 | Stakutis et al. | 707/10 |
| 2006/0015409 A1* | 1/2006 | Kato et al. | 705/26 |
| 2006/0100997 A1* | 5/2006 | Wall et al. | 707/3 |
| 2006/0101399 A1* | 5/2006 | Murayama et al. | 717/120 |
| 2006/0123468 A1* | 6/2006 | Bird et al. | 726/4 |
| 2006/0136337 A1* | 6/2006 | Sheikhrezai et al. | 705/44 |
| 2006/0217598 A1* | 9/2006 | Miyajima et al. | 600/300 |
| 2007/0125838 A1* | 6/2007 | Law et al. | 235/379 |
| 2008/0235399 A1* | 9/2008 | Maekawa et al. | 709/245 |
| 2009/0013324 A1* | 1/2009 | Gobara et al. | 718/104 |

FOREIGN PATENT DOCUMENTS

| | | |
|---|---|---|
| JP | 9 160990 | 6/1997 |
| JP | 10 228429 | 8/1998 |
| JP | 10 254791 | 9/1998 |
| JP | 2003-348282 | 12/2003 |
| JP | 2004-30063 | 1/2004 |
| JP | 2004-297526 | 10/2004 |
| JP | 2005 78418 | 3/2005 |

OTHER PUBLICATIONS

Taiwanese Office Action issued Dec. 20, 2011, in Patent Application No. 096112443 (with English-language translation).

Office Action issued on Feb. 25, 2011 in the corresponding Chinese Application No. 200780012577.2 (with English Translation).

Office Action issued Oct. 10, 2011, in Chinese Patent Application No. 200780012577.2 with English translation.

Chinese Office Action issued May 3, 2012, in Patent Application No. 200780012577.2 (with English-language translation).

* cited by examiner

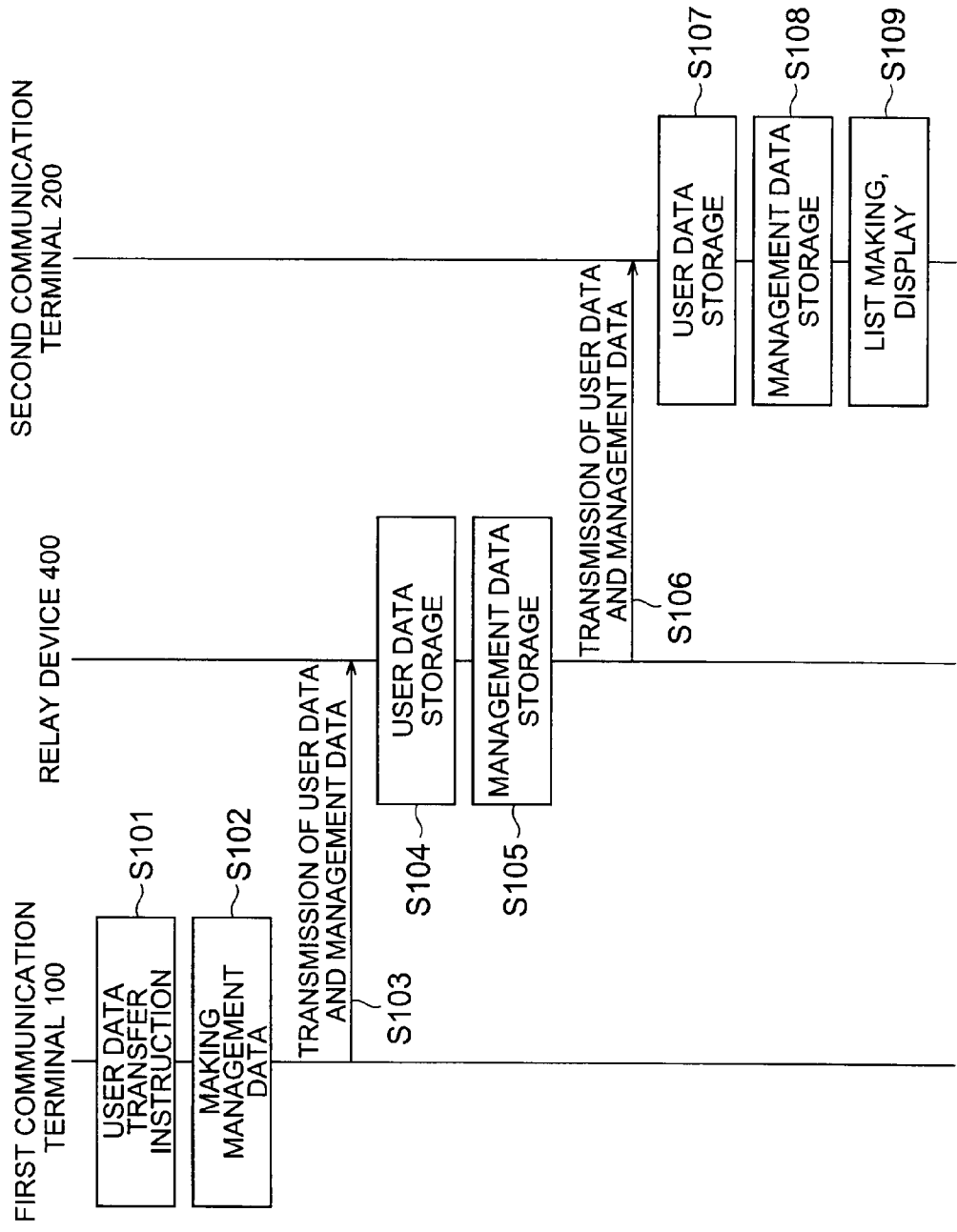

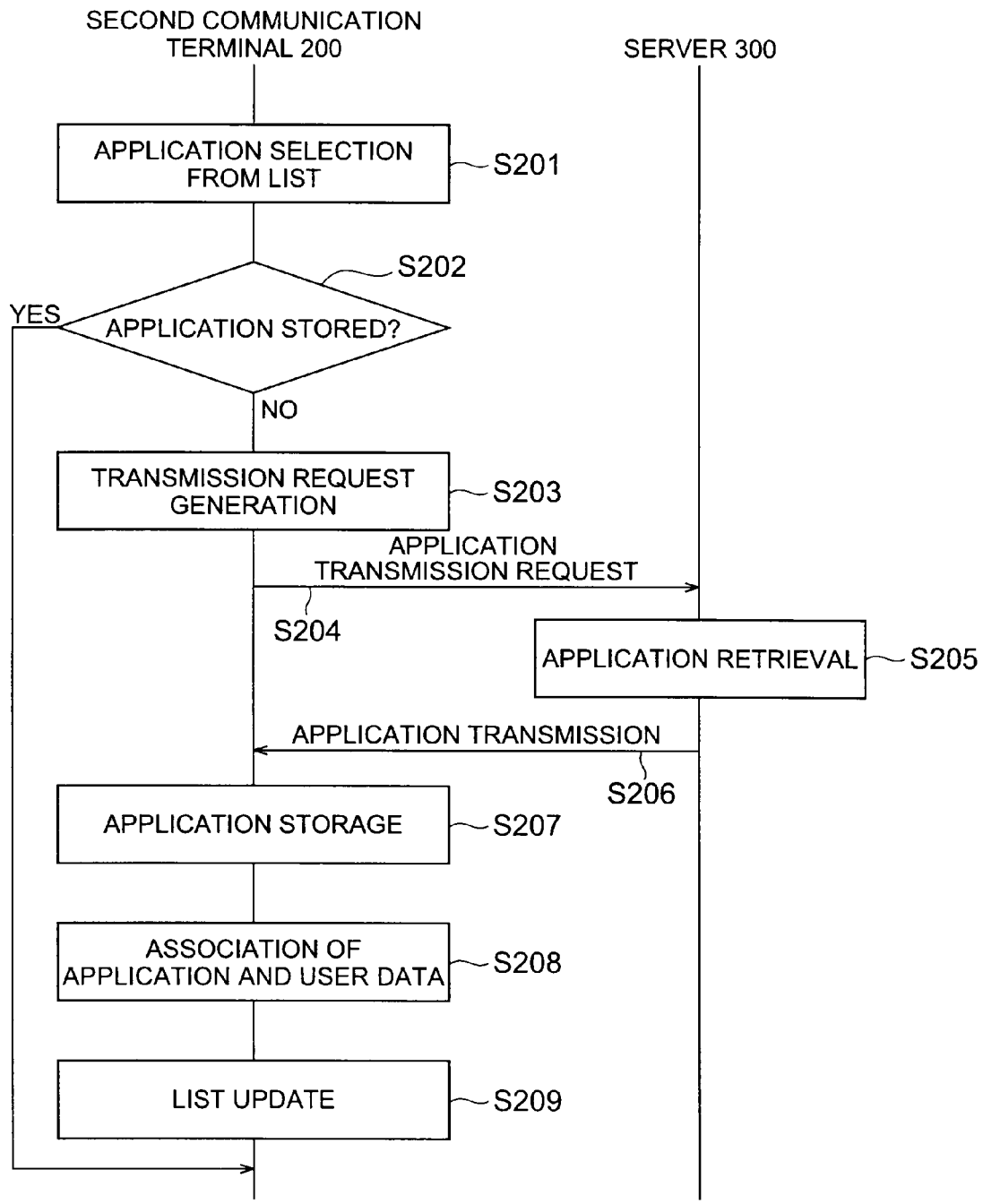

COMMUNICATION TERMINAL, USER DATA TRANSFERRING SYSTEM AND USER DATA TRANSFERRING METHOD

TECHNICAL FIELD

The present invention relates to a communication terminal, a user data transferring system, and a user data transferring method, and in particular relates to a communication terminal, a user data transferring system, and a user data transferring method, in which value data and other user data is used to execute an application.

BACKGROUND ART

Cellular phones and other communication terminals are widely known in which, by mounting a contact-free IC chip and executing a dedicated application, so-called electronic value, such as electronic money and electronic commuter passes, can be utilized. The user of such a communication terminal must transfer electronic value as user data between communication terminals when exchanging terminal models and remitting electronic value.

In Patent Reference 1, an electronic money transfer and relay system is disclosed in which, when transferring electronic value, electronic value held in an IC card is transferred to another IC card connected via an IC card reader/writer device and network, according to the processing procedure of a prescribed processing program.

And, in Patent Reference 2, a user data transferring system is disclosed, to transfer user data between cellular phones. In this user data transferring system, when exchanging cellular phone models, at first, attribute information (for example, filename, provider name) of contents (equivalent to user data) in the old terminal is temporarily held in temporary memory of an external system. Then, when the new terminal issues a request to the provider to re-download the contents, the provider queries the external system, references the attribute information stored in temporary memory, and permits download of the contents by the new terminal.

Patent Reference 1: Japanese Patent Laid-open Gazette No. Heisei 9-160990

Patent Reference 2: Japanese Patent Laid-open Gazette No. 2005-78418

DISCLOSURE OF THE INVENTION

Problems to be Solved by the Invention

However, the electronic money transfer and relay system described in the Patent Reference 1 can transfer electronic value between IC cards, but in applying the system to communication terminals requiring a dedicated application such as described above, if the new terminal or the communication terminal receiving the electronic value (hereafter called the receiving-side communication terminal) does not have the dedicated application, electronic value cannot be utilized. Hence, before executing a transfer task, a user must prepare a dedicated application in the receiving-side communication terminal in advance, or must confirm a site where the dedicated application can be acquired, so that the task is complicated. Further, in addition to electronic value, even if a dedicated application is transferred from an old terminal or the communication terminal remitting electronic value (hereafter called the sending-side communication terminal) to the receiving-side communication terminal, in a system where a device with small communication capacity (such as an IC card read/write device) intervenes, there is a problem that transferring tasks between communication terminals take a long time.

On the other hand, in the user data transferring system described in the Patent Reference 2, contents themselves are not directly transmitted from the sending-side communication terminal to the receiving-side communication terminal. Hence, even in a system where a device with small communication capacity intervenes, transferring tasks between communication terminals can be completed in a comparatively short time. However, similarly to the case of the Patent Reference 1, upon application to communication terminals which require a dedicated application such as described above, if the receiving-side communication terminal does not have the dedicated application, electronic value cannot be utilized. Hence, it is necessary to acquire the dedicated application separately from the transfer, and tasks become complicated.

Hence, an object of this invention is to provide a communication terminal, user data transferring system, and user data transferring method, capable of easy and prompt execution of the application after user data has been transferred.

Means for Solving the Problems

A communication terminal of this invention is a communication terminal which executes an application using user data which can be output to another communication terminal, and comprises management data making means for making management data including an access information of a server which can transmit the application, and data transmitting means for transmitting the user data and the management data to the other communication terminal.

By means of this invention, the access information of the server capable of transmitting an application are transmitted, together with user data, to the other communication terminal. Hence, even when the other communication terminal does not have an application which is executed by using the user data, the required application can be received from the server by using the transmitted access information. Consequently, there is no need for a user to prepare a dedicated application in another communication terminal or to confirm a site where the application can be acquired prior to performing a user data transfer task, and the application can be executed in the other communication terminal easily and promptly after transferring user data.

The management data may further include user identification information which identifies a user in order to execute an application. By means of this configuration, after the application has been received by another communication terminal, even in cases where user identification information is necessary to execute the application, the application can be executed without performing any special tasks by the user in the other communication terminal.

Further, the management data may further include a storage information (a storage address) for user data. By means of this configuration, even in a case of a communication terminal in which applications and user data are stored separately, a user can use another communication terminal to execute an application in a state where the application and the user data are associated, without performing any special tasks.

Further, the data transmitting means may transmit the user data and the management data to the other communication terminal via a relay device having relay storage means for storing the user data and the management data. By means of this configuration, even when the communication terminal does not have means to directly write user data onto another communication terminal, execution of the user data transfer is possible.

In addition to description as an invention relating to a communication terminal as explained above, this invention can also be described as a user data transferring system and as a user data transferring method, as explained below.

A user data transferring system of the invention comprises a server, a first communication terminal, and a second communication terminal; wherein the server has: application storage means for storing an application to be transmitted to the second communication terminal, request receiving means for receiving an application transmitting request from the second communication terminal; and application transmitting means for transmitting the application stored in the application storage means to the second communication terminal, in response to the transmission request received by the request receiving means, the first communication terminal has: management data making means for making management data including an access information of the server; and data transmission means for transmitting the management data and the user data used by the application to the second communication terminal, and the second communication terminal has: data receiving means for receiving the user data and the management data transmitted by the data transmission means of the first communication terminal; request transmitting means for transmitting an application transmission request to the server by using the access information in the management data to connect to the server; and application receiving means for receiving the application transmitted from the server in response to the transmission request.

Also, a user data transferring method of the invention is a method of transferring user data from a communication terminal which executes an application using the user data, to another communication terminal, comprising: a first transmission step of transmitting, from a first communication terminal to a second communication terminal, the user data and management data including an access information of a server which can transmit the application; and a second transmission step of transmitting the application from the server to the second communication terminal in response to a request from the second communication terminal which has connected to the server using the access information.

The invention of the user data transferring system and the invention of the user data transferring method have technical characteristics corresponding to the above-described invention of the communication terminal, and are inventions which provide similar action and advantageous results.

Effects of the Invention

By means of this invention, an access information of a server which can transmit an application is transmitted together with user data to the other communication terminal, so that the other communication terminal can receive a necessary application from a server and execute the application easily and promptly, by using the transmitted access information.

BRIEF DESCRIPTION OF THE DRAWINGS

FIG. 3 is a sequence diagram showing an operation up to making of an application list by a second communication terminal in the user data transferring system of FIG. 1.

FIG. 4 is a sequence diagram showing an operation for receiving an application by the second communication terminal in the user data transferring system of FIG. 1.

EXPLANATION OF REFERENCE NUMERALS

1 . . . User data transferring system, 100 . . . First communication terminal, 110 . . . Application receiving section, 120 . . . Storage section, 130 . . . User data processing section, 131 . . . User data storage section, 140 . . . Management data making section, 150 . . . Transmitting section, 151 . . . Request transmitting section, 152 . . . Data transmitting section, 160 . . . Input section, 200 . . . Second communication terminal, 210 . . . Receiving section, 211 . . . Application receiving section, 212 . . . Data receiving section, 220 . . . User data processing section, 221 . . . User data storage section, 222 . . . User data reading/writing section, 230 . . . Storage section, 240 . . . List making section, 250 . . . Display section, 260 . . . Input processing section, 270 . . . Request transmitting section, 300 . . . Server, 310 . . . Request receiving section, 320 . . . Application storage section, 330 . . . Application transmitting section, 400 . . . Relay device, 410 . . . Relay storage section, 420 . . . Writing/reading section, N . . . Information communication network.

BEST MODE FOR CARRYING OUT THE INVENTION

Figure 1:
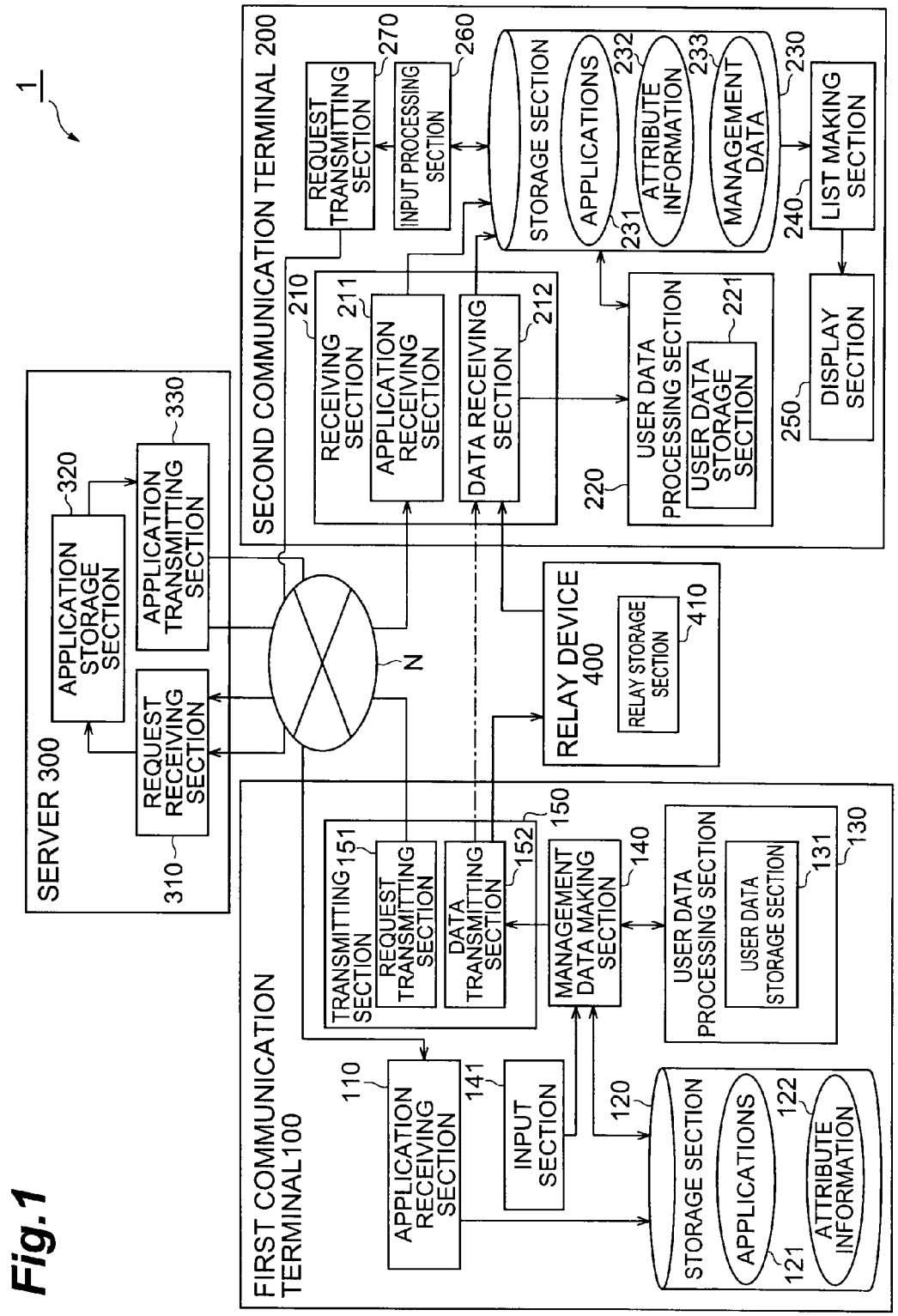
FIG. 1 is a system configuration diagram showing one embodiment of a user data transferring system of the invention.

A configuration of a user data transferring system of an embodiment of the invention is explained, referring to FIG. 1. FIG. 1 is a system configuration diagram of the user data transferring system. The user data transferring system 1 shown in FIG. 1 comprises a first communication terminal 100, a second communication terminal 200, a server 300, and a relay device 400.

The user data transferring system 1 is configured such that information communication is possible between the first communication terminal 100 and server 300, and between the second communication terminal 200 and server 300, via the information communication network N that comprises base stations, exchanges, and network equipment (none of which is shown). Moreover, the system is configured such that information communication is possible between the first communication terminal 100 and the second communication terminal 200 via the relay device 400.

Next, details of the configuration of the first communication terminal 100 and second communication terminal 200 are explained using FIG. 1, for an example in which both are communication terminals that can execute an application using electronic value (electronic money, electronic commuter passes, and similar) as user data. Examples of such terminals include cellular phones and PDAs (Personal Digital Assistants) having communication functions.

<First Communication Terminal>

The first communication terminal 100 is a terminal which is equipped with a contact-free IC chip which stores electronic value as user data, and which can use electronic value when executing an application. Moreover, the electronic value which is user data used in an application can be output to another communication terminal. This first communication terminal 100 is the old terminal when exchanging terminal models accompanied by transfer of user data, or is the communication terminal on the side remitting electronic value (the sending-side communication terminal) when remitting electronic value.

The first communication terminal 100 comprises, as functional constituent elements, an application receiving section 110, a storage section 120, a user data processing section 130, a management data making section 140 (management data making means), an input section 141, and a transmitting section 150 (data transmission means).

The application receiving section 110 is a section which receives an application transmitted from a server 300 in response to a transmission request by the request transmitting section 151, described below. There are no limitations on the functions of applications which can be received by the application receiving section 110, and in addition to applications which use electronic value, examples of other applications include applications for playback of music, playback of video, games, and similar.

Data of an application received by the application receiving section 110 includes application identification information (the application name, function names, and similar) specifying the application and attribute information (the access information of the server 300). This attribute information can be included in data of a file received together with data of the application. Such a file can be what is called ADF (Application Descriptor File). An application name or function names of the application, an access information of the server 300, the application size, the final revision date, and other information which can be used as attribute information are described in the ADF.

Upon receiving the application from the server 300, the application receiving section 110 outputs the application together with attribute information, to the storage section 120.

The storage section 120 is a section which stores the application and the attribute information output from the application receiving section 110. The application 121 and the attribute information 122 stored in the storage section 120 are configured to enable execution of various processing and data output, in response to requests from the user data processing section 130 and the management data making section 140, described below.

The user data processing section 130 is a section which handles electronic money and other electronic value as user data, and, for example, is configured using a contact-free IC chip incorporated into the first communication terminal 100. This user data processing section 130 comprises a user data storage section 131 which stores user data, and is configured so as to be capable of input/output and updating of data stored in the user data storage section 131 by communicating with an external reading/writing device (not shown), while cooperating with the application 121 stored in the storage section 120. The user data processing section 130 is configured so as to be able to output user data (for example, data regarding electronic value) to the transmitting section 150 in response to a request from the management data making section 140.

The management data making section 140 is a section which makes management data including access information (for example, URLs) of a server capable of transmitting the application 121, application identification information (for example, application names and function names) specifying the application 121, and similar. This management data making section 140 receives instructions regarding user data transfer from an input section 141 including cursor keys, numeric keys, or other input means (not shown), references attribute information 122 stored in the storage section 120, and makes management data to be transmitted by the data transmitting section 152 in the transmitting section 150.

Management data made by the management data making section 140 is not limited to access information of the server 300 capable of transmitting the application 121, but can also include user identification information which identifies users for executing the application 121. By this configuration, after another communication terminal has received the application, the user can execute the application without performing any special tasks at the second communication terminal 200, even when user identification information is required in order to execute the application. Also, a configuration where, when there is no valid user identification information in the second communication terminal 200, the received application cannot be executed can be employed.

For example, when the first communication terminal 100 is a cellular phone, user identification information may be UIM (User Identity Module) execution information which specifies a UIM which memorizes contracting party information and similar. By using UIM execution information as user identification information, a configuration is possible where the identity of the UIM used by the cellular phone after model exchange (that is, the second communication terminal 200) and the UIM specified by the UIM execution information is confirmed, and if the UIMs do not coincide, the user cannot execute the application received by the second communication terminal 200.

Further, management data which is to be made can include a storage address of user data in the user data storage section 131. By transmitting the management data including the storage address for user data to the other communication terminal, the other communication terminal (second communication terminal 200) that has received the management data, can set an address at which user data is stored in the storage section for user data (user data storage section 221) to be the same as the address at which user data is stored in the user data storage section 131. Hence, even when applications and user data are stored separately in communication terminals, a user can execute the application in a state where the application and the user data are associated with each other, without performing any special tasks at the other communication terminal.

The transmitting section 150 is a section which transmits data to the server 300 and the relay device 400, and comprises a request transmitting section 151 and a data transmitting section 152. The request transmitting section 151 transmits application transmitting requests to the server 300 via the information communication network N. The data transmitting section 152 transmits user data and management data to the second communication terminal 200, either directly or via the relay device 400, described below. The connection with the other device (the server 300 or the relay device 400) in these transmissions may be either wireless or by wire.

The actions and effects of the first communication terminal 100 of this embodiment described above, are explained. By means of the first communication terminal 100 of this embodiment, the access information of a server 300 capable of transmitting an application is transmitted together with user data, to the second communication terminal 200. Hence, even when the second communication terminal 200 does not have an application which can be executed using the user data, the required application is received from the server 300, by using the transmitted access information. Hence, the user need not prepare a dedicated application in the second communication terminal 200 or confirm a site where the dedicated application can be acquired, before performing the task of transferring user data, and after user data has been transferred, the application can easily and promptly be executed by the second communication terminal 200.

<Second Communication Terminal>

The second communication terminal 200, similarly to the first communication terminal 100, is a terminal which is equipped with a contact-free IC chip, and which can utilize electronic value by executing an application. This second communication terminal 200 is the communication terminal which is the new terminal when exchanging models accompanied by transfer of user data described below and which is the communication terminal receiving the remittance of electronic value (the receiving-side communication terminal) when remitting electronic value.

The second communication terminal 200 comprises, as functional constituent elements, a receiving section 210 (application receiving means, data receiving means), a user data processing section 220, a storage section 230, a list making section 240, a display section 250, an input processing section 260, and a request transmitting section 270 (request transmitting means).

The receiving section 210 is a section which receives data transmitted from the first communication terminal 100, the server 300 and the relay device 400, and comprises an application receiving section 211 (application receiving means) and a data receiving section 212 (data receiving means).

The application receiving section 211 has functions equivalent to those of the application receiving section 110 in the first communication terminal 100, and is a section which receives an application transmitted from the server 300 as a result of receipt of a transmission request by the request transmitting section 270, described below. Upon receiving the application from the application transmitting section 330 in the server 300, this application receiving section 211 outputs the application to the storage section 230. Similarly to the case of the first communication terminal 100, no limitations are placed on the functions of applications which can be received by the application receiving section 211. Further, the application receiving section 211 can receive applications including attribute information, and can receive an ADF (Application Descriptor File) together with data for the application.

The data receiving section 212 is a section which receives user data and management data transmitted from the first communication terminal 100, either directly or via the relay device 400 described below. As explained above, the management data includes the access information of the server 300 capable of transmitting the application 121, and application identification information which specifies the application 121. Upon receiving the user data and the management data, this data receiving section 212 outputs the user data to the user data processing section 220 and the management data to the storage section 230.

The user data processing section 220 has functions equivalent to those of the user data processing section 130 in the first communication terminal 100, and is a section which handles electronic money and other electronic value as user data. Similarly to the user data processing section 130, the user data processing section 220 can be configured to use a contact-free IC chip incorporated into the second communication terminal 200. This user data processing section 220 comprises a user data storage section 221 which stores user data, and is configured so as to be capable of input/output and updating of stored data by communicating with an external reading/writing device (not shown), while cooperating with the application 231 stored in the storage section 230.

The storage section 230 is a section which stores an application and attribute information output from the application receiving section 211, as well as management data output from the data receiving section 212. Various processing and data output can be executed by the application 231, attribute information 232 and management data 233 stored in the storage section 230, in response to requests from the user data processing section 220 and the list making section 240 described below.

The list making section 240 is a section which makes a list of applications received by the application receiving section 211, and which makes a list of applications indicated by the management data received by the data receiving section 212. The list of applications thus made is displayed on the display section 250 as a menu used in startup of applications.

Figure 2:
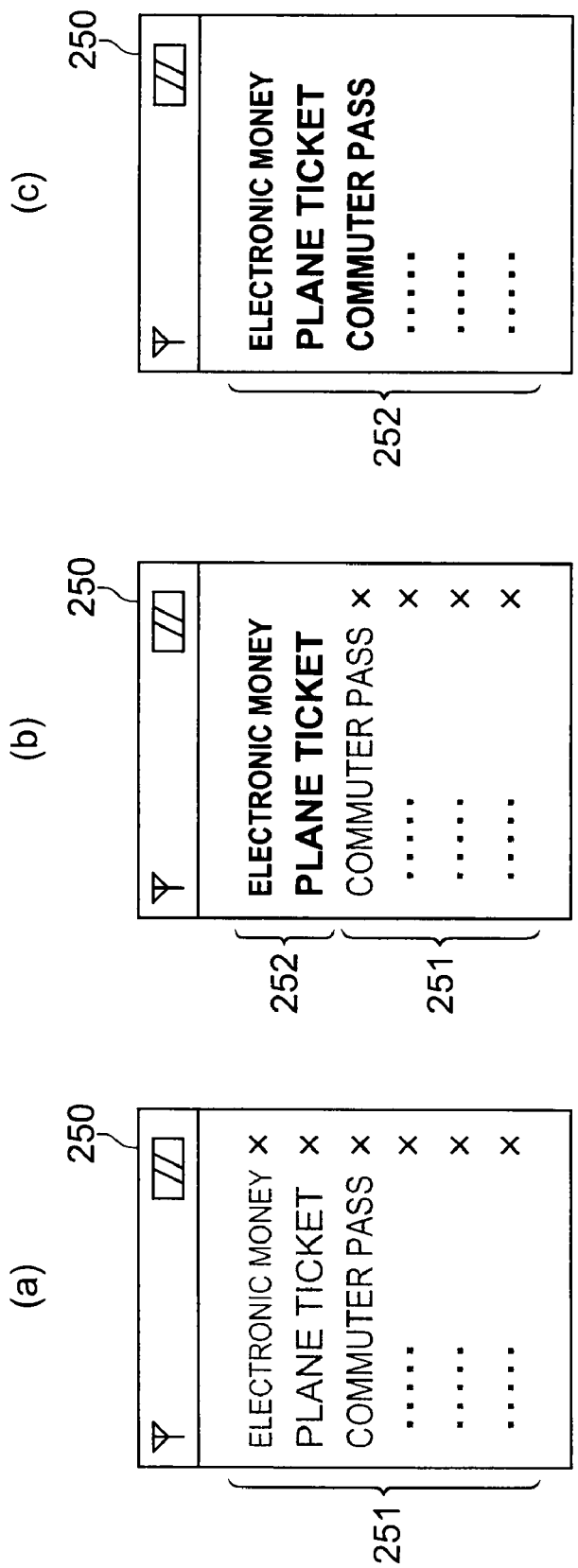
FIG. 2 is a diagram showing an example of an application list displayed in a display section of a second communication terminal.

In the list made by the list making section 240, among the applications for which management data has been received, those applications which are not stored in the storage section 230 are displayed on the display section 250 in a first mode (for example, a grayed-out display 251 in (a) of FIG. 2), and those applications stored in the storage section 230 are displayed in a second mode different from the first mode (for example, the normal display 252 in (b) and (c) of FIG. 2). Here, (b) of FIG. 2 corresponds to a case in which, among the applications for which management data has been received, some of the applications are stored in the storage section 230, while (c) of FIG. 2 corresponds to a case where all of the applications for which management data has been received are stored in the storage section 230. In this way, by imparting differences between the first and the second modes, applications which are stored in the storage section 230 and applications which are not stored in the storage section 230 can easily be identified.

The list made by the list making section 240 can be a list which lists application names or function names of the application included in the application identification information of the management data 233 (see (a) to (c) of FIG. 2). Furthermore, in the first mode, together with the grayed-out display 251 or in place of the grayed-out display 251, a symbol, mark, or figure can be added to the application names or to the function names (see (a) and (b) of FIG. 2).

The display section 250 is a section which displays the list made by the list making section 240 (see (a) to (c) of FIG. 2). This display section 250 employs, for example, a liquid crystal screen built into the second communication terminal 200, and can be shared with sections performing display regarding voice communication functions, data communication functions, and other functions of the second communication terminal 200.

The input processing section 260 performs application execution or reception processing, according to the application selected from the list displayed by the display section 250 by using the arrow keys, numeric keys, or other input means (not shown). Specifically, when it is judged that the application selected from the list is stored in the storage section 230, processing is performed to execute the application. On the other hand, when it is judged that the application selected from the list is not stored in the storage section 230, the input processing section 260 reads the access information of the server 300 storing the selected application from the management data 233 stored in the storage section 230, and outputs the access information to the request transmitting section 270, and moreover outputs, to the request transmitting section 270, an instruction to transmit a transmission request for the application to the server 300. The judgment as to whether an application is stored in the storage section 230 can be performed by attempting to read the application from the storage section 230, for example.

The request transmitting section 270 receives the access information of the server 300 and an output regarding the application transmitting request from the input processing section 260, and uses the access information contained in management data 233 to transmit a transmission request for the application to the server 300.

The actions and effects of the second communication terminal 200 of this embodiment described above are explained. By means of the second communication terminal 200 of this embodiment, when management data including an access information (for example, an URL) of a server and application identification information is received by the data receiving section 212, from the other communication terminal (the first communication terminal 100), the list making section 240 makes a list including applications which are not stored in the storage section 230. When an application which is not stored in the storage section 230 is selected from the list, the second communication terminal 200 uses the access information included in the management data 233 to transmit a transmission request for the application to the server 300. Hence, the user can easily download the application to the second communication terminal 200 simply by selecting the application from the list, without starting up an application to view electronic mail.

<Server>

The server 300 comprises, as functional constituent elements, a request receiving section 310, an application storage section 320, and an application transmitting section 330.

The request receiving section 310 is a section which receives transmission requests for applications from the request transmitting section 151 in the first communication terminal 100 or from the request transmitting section 270 in the second communication terminal 200. A received transmission request is output to the application storage section 320.

The application storage section 320 is a section which stores applications used by the first communication terminal 100 and second communication terminal 200. The application storage section 320 receives input from the request receiving section 310, and outputs applications corresponding to transmission requests from communication terminals, to the application transmitting section 330.

The application transmitting section 330 receives input from the application storage section 320, and transmits applications corresponding to transmission requests to the communication terminals which transmitted the transmission requests.

<Relay Device>

The relay device 400 is a device which relays user data and management data from the first communication terminal 100 to the second communication terminal 200, and comprises, as a functional constituent element, a relay storage section 410. The relay storage section 410 stores user data and management data transmitted from the data transmitting section 152 in the first communication terminal 100, and transmits the user data and the management data to the data receiving section 212 in the second communication terminal 200. The relay device 400 can be configured such that, after completion of transmission to the data receiving section 212, the user data and the management data stored in the relay storage section 410 are deleted.

The relay device 400 is not connected to the information communication network N, but is configured as a separate network comprising the first communication terminal 100, the second communication terminal 200, and the server 300. A personal computer can be used as a relay device 400; the connection between the first communication terminal 100 and the relay device 400 can be wireless or by wire, and the connection between the second communication terminal 200 and the relay device 400 can be wireless or by wire.

In the user data transferring system 1 of this embodiment, by providing the above-described relay device 400, the first communication terminal 100 can transmit user data and management data to the second communication terminal 200, without the mediation of the information communication network N. Hence compared with transfer of user data via the information communication network N to which a large and indefinite number of users can connect, the possibility of hacking, data tampering, and similar through intrusion from outside can be reduced. Also, even in cases of a configuration in which the first communication terminal 100 cannot directly perform writing of user data to the user data storage section 221 in the second communication terminal 200, transfer of user data can be executed.

<User Data Transferring Method and Method of List Display in Second Communication Terminal>

Next, the user data transfer method of this embodiment of the invention is explained, referring to FIG. 3 and FIG. 4. The list display method executed by the second communication terminal 200 accompanying transfer of user data is also explained. FIG. 3 is a sequence diagram showing an operation up to making of an application list by the second communication terminal in the user data transferring system shown in FIG. 1. FIG. 4 is a sequence diagram showing an operation regarding reception of applications by the second communication terminal in the user data transferring system of FIG. 1.

In the following explanation, a case is considered where in order for a user to perform model exchange from a first communication terminal 100 to a second communication terminal 200, all types of user data (electronic money, electronic commuter passes, and similar) stored in the user data storage section 131 in the first communication terminal 100 are transferred to the second communication terminal 200, and applications necessary to use this user data can be used on the second communication terminal 200.

First, when an instruction for user data transfer is input at the input section 141 in the first communication terminal 100 (S101), the management data making section 140 references attribute information in the storage section 120, and makes management data including the access information of the server 300 which is capable of transmitting applications corresponding to the user data (S102). As explained above, management data made by the management data making section 140 can include, in addition to access information of the server 300, application identification information (application names, function names, and similar), user identification information, and storage addresses for user data.

After the input of management data made by the management data making section 140, the data transmitting section 152 receives user data which is outputted from the user data storage section 131 in response to a request from the management data making section 140, and transmits the user data and management data to the relay device 400 (S103).

The relay device 400, upon receiving user data and management data, temporarily stores the user data and the management data in the relay storage section 410 (S104, S105), and transmits the user data and the management data to the data receiving section 212 in the second communication terminal 200 (S106). Transmission to the data receiving section 212 can be started automatically after the user data and the management data have been stored in the relay storage section 410, or can be started after reception of a user instruction from the first communication terminal 100 or the relay device 400. The user data and the management data stored in the relay storage section 410 can be deleted after normal completion of transmission to the data receiving section 212.

In the second communication terminal 200, after the data receiving section 212 receives the user data and the management data, the user data and the management data are stored in the storage section 230 (S107, S108).

By this procedure, in the user data transferring system 1, processing to transmit the user data and the management data including access information of the server 300 capable of transmitting applications which are necessary to use the user data, from the first communication terminal 100 to the second communication terminal 200 (first transmission step) is completed. And in the second communication terminal 200, processing to receive the management data from the first communication terminal 100 is completed.

After the user data and the management data have been stored in the storage section 230, the list making section 240 uses the management data 233 received and the attribute information 232 of applications 231 already stored, makes a list of menus for use in starting applications, and displays the list on the display section 250 (S109). In the list made in S109, applications which are not stored in the storage section 230 are shown with a grayed-out display 251 (first mode) in the display section 250, and applications stored in the storage section 230 are displayed with normal display 252 (second mode), as shown in (a) to (c) of FIG. 2.

By this procedure, processing to make a list of applications for which management data has been received but are not stored in the storage section 230, and processing to display the list is completed.

Next, processing to receive applications necessary to use user data in the second communication terminal 200 is explained.

When the input processing section 260 is used to select an application from the list made by the list making section 240 (S201), the input processing section 260 checks whether the selected application is stored in the storage section 230 (S202). This check can be performed by attempting to read the application from the storage section 230. Or, attribute information 232 and management data 233 stored in the storage section 230 can be used.

When the selected application is not stored in the storage section 230, the input processing section 260 references management data 233 stored in the storage section 230, and outputs the access information of a server 300 on which the selected application is stored and an instruction to transmit a transmission request for the application, to the request transmission section 270.

The request transmission section 270 receives the access information of the server 300 and the output relating to the application transmitting request from the input processing section 260, generates an application transmitting request for the server 300 (S203), and transmits the application transmitting request to the server 300 (S204). By this procedure, when an application which is not stored in the storage section 230 is selected from a list, the application transmitting request is transmitted to the server 300 by using the access information in the management data 233.

On the other hand, when the selected application is stored in the storage section 230, processing to receive the application is not performed, and instead the input processing section 260 performs processing to execute the application.

When the request receiving section 310 in the server 300 receives the transmission request, the application storage section 320 outputs the application corresponding to the transmission request by the second communication terminal 200, to the application transmitting section 330, and in this way the application is retrieved (S205). On receiving input from the application storage section 320, the application transmitting section 330 transmits the application to the application receiving section 211 in the second communication terminal 200 (S206).

The storage section 230 stores the application which has been received and output by the application receiving section 211 (S207). When management data stored in the storage section 230 includes a storage address for user data, the user data processing section 220 stores the user data at the storage address in the user data storage section 221 specified by management data (S208).

After the storage section 230 stores the application received from the server 300, the list making section 240 updates the list, by displaying stored applications with normal display 252 and continuing to display unstored applications with grayed-out display 251, as shown in (a) and (b) of FIG. 2 (S209).

By this procedure, processing (second transmission step) that the application is transmitted from the server 300 to the second communication terminal 200 in response to a request from the second communication terminal 200 which has connected to the server 300 by using the access information in the management data 233, is completed.

By means of the user data transferring method of this embodiment including the steps described above, the access information of the server 300 which can transmit an application together with user data is transmitted to the second communication terminal 200. Hence, even when the second communication terminal 200 does not have an application which is to be executed to use the user data, the transmitted access information can be used to receive the required application from the server 300. Hence, the user need not prepare a dedicated application on the second communication terminal 200, or confirm a site where the dedicated application can be acquired, prior to performing the user data transfer task, and after user data has been transferred, the application can be executed easily and promptly by the other communication terminal.

Further, the user data transferring method of this embodiment, having the steps described above, can be regarded as a list display method for the second communication terminal 200 to display a list of applications. And, by means of this user data transferring method, when the data receiving section 212 in the second communication terminal 200 receives management data including an access information (for example, an URL) of a server and application identification information, from the first communication terminal 100, the list making section 240 makes a list including applications which are not stored in the storage section 230. When an application which is not stored in the storage section 230 is selected from the list, an application transmitting request is transmitted to the server 300 by using the access information in the management data. Hence, the user need not start an application to view electronic mail, and can easily download an application to the second communication terminal 200 by simply selecting the application from the list.

This invention is not limited to the above-described embodiments, and of course various modifications can be made without deviating from the scope of the gist of the invention.

For example, a configuration (indicated by the dot-dash line in FIG. 1) can be employed in which, by providing infrared communication, close-range wireless communication, user data reader/writer or other means in the transmitting section 150 and receiving section 210, user data and management data can be transmitted directly from the first communication terminal 100 to the second communication terminal 200, without passing through the relay device 400.

In the above embodiments, a case was explained of performing a model exchange from the first communication terminal 100 to the second communication terminal 200; but this invention can similarly be applied to cases where user data is transferred in order to remit some of the stored electronic money.

Also, in the above embodiments, the first communication terminal 100 and the second communication terminal 200 have different configurations; but by adding elements missing in each of the communication terminals (the list making section 240, display section 250, input processing section 260, and similar), the first communication terminal 100 and the second communication terminal 200 can have the same configuration.

Industrial Applicability

By means of this invention, a communication terminal, a user data transferring system, and a user data transferring method can be provided which enable easy and prompt execution of an application after transfer of user data.

The invention claimed is:

1. A user data transferring system comprising:
a first communication terminal; and
a second communication terminal,
wherein the first communication terminal includes:
   a first user data storage section configured to store user data;
   a user data processing section configured to perform input/output and update of the user data stored in the first user data storage section while cooperating with an application;
   a management data making section configured to make management data including an access information of a server which can transmit the application; and
   a data transmission section configured to transmit the user data and the management data to the second communication terminal without transmitting the user data and the management data to the server, and
the second communication terminal includes:
   a data receiving section configured to communicate with the data transmission section via a direct local connection and receive the user data and the management data transmitted from the data transmission section;
   a second user data storage section configured to store the user data received by the data receiving section; and
   a management data storage section configured to store the management data received by the data receiving section, wherein the user data is electronic money or an electronic commuter pass and the application utilizes the electronic money or the electronic commuter pass in its operation,
wherein the management data includes application identification information which identifies the application, and the second communication terminal comprises:
an application storage section configured to store the application;
a list making section configured to make a list listing applications indicated by the application identification information included in the management data received by the data receiving section;
a display section configured to display the list made by the list making section;
a request transmitting section configured to transmit a transmission request of the application to the server by using the access information in the management data, when an application which is not stored in the application storage section is selected from the list; and
an application receiving section that is different from the data receiving section configured to receive the application transmitted from the server in response to the transmission request via an information communication network.

2. The user data transferring system according to claim 1, wherein the management data further includes user identification information which identifies a user in order to execute the application.

3. The user data transferring system according to claim 2, wherein the management data further includes a storage information of the user data which corresponds to a storage address of the user data at the first communication terminal.

4. The user data transferring system according to claim 3, wherein the data transmission section transmits the user data and the management data to the second communication terminal via a relay device having a relay storage section configured to store the user data and the management data.

5. The user data transferring system according to claim 2, wherein the data transmission section transmits the user data and the management data to the second communication terminal via a relay device having a relay storage section configured to store the user data and the management data.

6. The user data transferring system according to claim 1, wherein the management data further includes a storage information of the user data which corresponds to a storage address of the user data at the first communication terminal.

7. The user data transferring system according to claim 6, wherein the data transmission section transmits the user data and the management data to the second communication terminal via a relay device having a relay storage section configured to store the user data and the management data.

8. The user data transferring system according to claim 1, wherein the data transmission section transmits the user data and the management data to the second communication terminal via a relay device having a relay storage section configured to store the user data and the management data.

9. The user data transferring system according to claim 1, wherein the management data includes a URL address of the server.

10. The user data transferring system according to claim 1, wherein the second user data storage section stores the user data in association with an application received by the application receiving section.

11. The user data transferring system according to claim 1, wherein the list making section makes a list displaying, in a first mode, an application which is not stored in the application storage section and displaying, in a second mode that is different from the first mode, an application that is stored in the application storage section.

12. The user data transferring system according to claim 11, wherein the list making section updates the list when the application receiving section receives the application.

13. A user data transferring system, comprising a server, a first communication terminal, and a second communication terminal, wherein
the server including:
   an application storage section configured to store an application to be transmitted to the second communication terminal,
   a request receiving section configured to receive an application transmitting request from the second communication terminal; and
   an application transmitting section configured to transmit the application stored in the application storage section to the second communication terminal, in response to the transmission request received by the request receiving section, the first communication terminal including:
- a first user data storage section configured to store user data;
- a user data processing section configured to perform input/output and update of the user data stored in the first user data storage section while cooperating with an application;
- a management data making section configured to make management data including an access information of the server which can transmit the application; and
- a data transmission section configured to transmit the user data and the management data to the second communication terminal without transmitting the user data and the management data to the server, and the second communication terminal including:
- a data receiving section configured to communicate with the data transmission section via a direct local connection and receive the user data and the management data transmitted from the data transmission section;
- a second user data storage section configured to store the user data received by the data receiving section; and
- a management data storage section configured to store the management data received by the data receiving section, wherein the user data is electronic money or an electronic commuter pass and the application utilizes the electronic money or the electronic commuter pass in its operation, wherein the management data includes application identification information which identifies the application, and the second communication terminal comprises:
- an application storage section configured to store the application;
- a list making section configured to make a list listing applications indicated by the application identification information included in the management data received by the data receiving section;
- a display section configured to display the list made by the list making section;
- a request transmitting section configured to transmit a transmission request of the application to the server by using the access information in the management data, when an application which is not stored in the application storage section is selected from the list; and
- an application receiving section that is different from the data receiving section configured to receive the application transmitted from the server in response to the transmission request via an information communication network.

14. The user data transferring system according to claim 13, wherein the management data further includes a storage information of the user data which corresponds to a storage address of the user data at a storage unit located at the first communication terminal, and the second communication terminal sets an address at which the user data is stored at a storage unit located at the second communication terminal to be the same as the storage address of the user data at the first communication terminal.

15. A user data transferring method, implemented on a system including a first communication terminal and a second communication terminal, for transferring user data from the first communication terminal which executes an application using the user data, to the second communication terminal, the method comprising:
- storing user data at a first user data section of the first communication terminal;
- performing, at a user data processing section of the first communication terminal, input/output and update of the user data stored in the first user data storage section while cooperating with an application;
- making, at a management data making section of the first communication terminal, management data including an access information of a server which can transmit the application;
- transmitting, at a data transmission section of the first communication terminal, the user data and the management data to the second communication terminal without transmitting the user data and the management data to the server;
- communicating, at a data receiving section of the second communication terminal, with the data transmission section via a direct local connection and receiving the user data and the management data transmitted from the data transmission section;
- storing, at a second user data storage section of the second communication terminal, the user data received by the data receiving section; and
- storing, at a management data storage section of the second communication terminal, the management data received by the data receiving section, wherein the user data is electronic money or an electronic commuter pass and the application utilizes the electronic money or the electronic commuter pass in its operation, wherein the management data includes application identification information which identifies the application, and the method further includes:
- storing, at an application storage section of the second communication terminal, the application;
- making, at a list making section of the second communication terminal, a list listing applications indicated by the application identification information included in the management data received by the data receiving section;
- displaying, at a display section of the second communication terminal, the list made by the list making section;
- transmitting, at a request transmitting section of the second communication terminal, a transmission request of the application to the server by using the access information in the management data, when an application which is not stored in the application storage section is selected from the list; and
- receiving, at an application receiving section of the second communication terminal that is different from the data receiving section, the application transmitted from the server in response to the transmission request via an information communication network.

* * * * *